Sept. 4, 1956 P. RAVIGNEAUX 2,761,333
EPICYCLIC CHANGE-SPEED GEAR
Filed March 24, 1952 3 Sheets-Sheet 1

Inventor
P. Ravigneaux

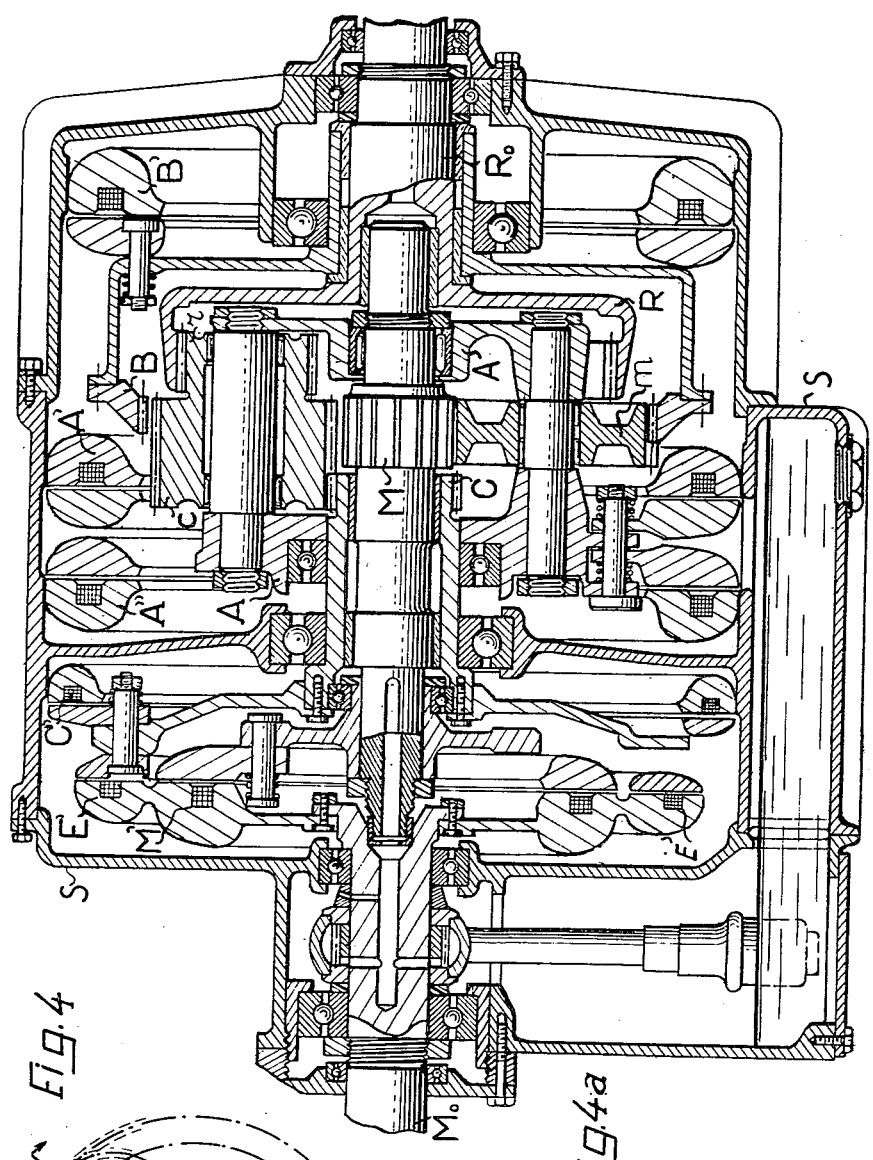
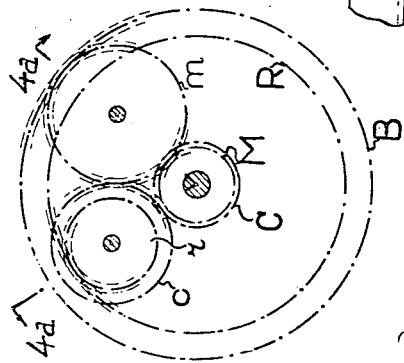

Sept. 4, 1956     P. RAVIGNEAUX     2,761,333
EPICYCLIC CHANGE-SPEED GEAR

United States Patent Office 2,761,333
Patented Sept. 4, 1956

2,761,333
EPICYCLIC CHANGE-SPEED GEAR

Pol Ravigneaux, Neuilly-sur-Seine, France

Application March 24, 1952, Serial No. 278,199

Claims priority, application France March 31, 1951

5 Claims. (Cl. 74—759)

This invention relates to speed changing devices of the type described in my U. S. Patent No. 2,220,174.

These devices are essentially constituted by an epicyclic assembly comprising two central wheels, two internal tooth annuli and at least one pair of planet-wheels, each of which meshes with one central wheel and one annulus, both planet-wheels further meshing together and the axes of said planet-wheels being mounted on a common support which will be called hereafter the planet-carrier.

It is also possible to omit one annulus, one planet-wheel of each pair then meshing with one central wheel and the single remaining annulus, while the other planet-wheel of each pair meshes with the other central wheel and the first mentioned planet-wheel.

One object of this invention is to provide a speed changing device of this type in which at least one of the planet-wheels of each pair is constituted by a pinion having two toothings of different pitch circles, or "step pinion."

This arrangement offers many advantages, as explained hereunder. In particular, it permits reducing the diametral and axial size of the gear-box, thanks to the additional demultiplying provided through the step pinion or pinions.

Now, in these devices, as described in the above mentioned patent, two coaxial members are made rotatively fast with the driving and driven shafts respectively and the various forward speed ratios are obtained by holding stationary or stopping selectively the other coaxial members of the epicyclic assembly.

Direct drive is obtained by making any two coaxial members rotatively fast with one another. Back drive is obtained by changing either the driving or the driven member while simultaneously holding the planet-carrier stationary as exposed respectively in the above mentioned patent and in my prior Patent No. 2,631,476.

Another object of the invention is to provide a device of the type described in which all means for stopping selectively members of the gear and for making selectively two members rotatively fast with one another are constituted by friction elements, which permits smooth and progressive stopping and clutching, respectively.

A further object of the invention is to provide an electro-magnetically controlled gear-box of the above mentioned type in which said friction elements are constituted by electro-magnets.

Still a further object of the invention is to provide an electro-magnetic gear-box of this type in which at least one of the progressively stopping means, preferably that of the planet-carrier, is constituted by a double electro-magnet, the diametral size of which is smaller than the diametral size of one single electro-magnet having the same torque-generating power.

Other objects and advantages of the invention will be apparent from the following detailed description, together with the accompanying drawings, submitted for purposes of illustration only and not intended to define the scope of the invention, reference being had for that purpose to the subjoined claims.

In these drawings:

Fig. 4 shows the pitch circles of the various wheels of the constructive embodiment shown in Fig. 4a.

Fig. 4a is a view constituted by two half sectional views along radii 4a—4a of Fig. 4 showing the compactness of said constructive embodiment.

Fig. 5 is an enlarged view of the step planet-wheel used in the constructive embodiment shown in Figs. 4 and 4a.

Figure 1:
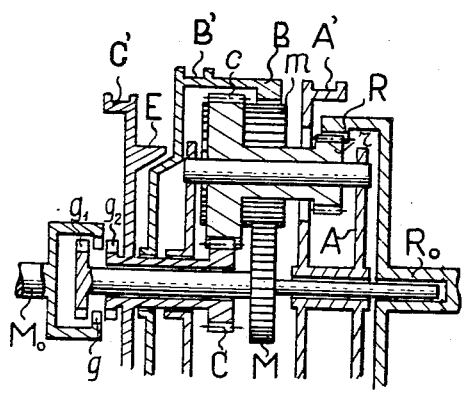
Fig. 1 is a diagrammatical view of one embodiment of the invention in which one single planet-wheel is a step pinion and in which the back drive is obtained by changing the driving member.
Figure 1A:
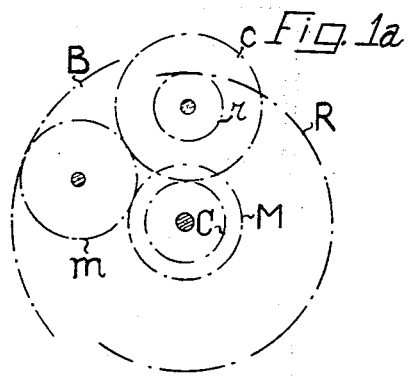
Fig. 1a shows the pitch circles of the various wheels, of the gear shown in Fig. 1.

In the embodiment shown in Figs. 1 and 1a, the central wheels diagrammatically shown under the shape of their pitch cylinders are indicated respectively by letters M and C, M being the driving member and C the central wheel to be stopped at all forward speeds.

The two annuli are referred to by letters R and B, respectively, R being the receiving member and B the annulus to be stopped at all speeds.

In the example shown, the central wheel M is connected with annulus B through one single planet-wheel $m$ having a normal spur-toothing and rotated on a planet-carrier A. The central wheel C is connected with annulus R through one single planet-wheel also rotated on planet-carrier A, said planet-wheel being provided with two different toothings, the larger of which, $c$, meshes with C while the other one, $r$, meshes with R. The two planet-wheels also mesh with one another through toothings $m$ and $c$, as shown in Fig. 1a, on which the meshing points of the different wheels have been indicated.

In Fig. 1, planet-wheel $m$ has been shown in the plane of the figure, behind the other planet-wheel, for the sake of clearness.

It will be seen that the step planet-wheel $c$—$r$ crosses over the meshing area of $m$ with M and B, respectively, this arrangement giving access to the stopping means secured on B.

The various stopping means have been illustrated under the shape of brake drums A', B', C', secured on A, B and C, respectively.

At forward speeds, the claws $g$ of a prime driving member $M_0$ are clutched with claws $g_1$ rotatively fast with the central wheel M.

In these conditions, when the planet-carrier A is stopped, the lowermost speed ratio or first speed is obtained. The second speed is obtained by stopping B, while the stopping of C permits obtaining the third speed.

The direct drive is obtained by making any two members of the gear rotatively fast with one another, e. g. by means of a clutch, diagrammatically shown at E, which makes B and C rotatively fast with one another.

The use of a step planet-wheel permits to reduce, in a considerable extent, the diametral size of the whole assembly.

This may be shown easily by considering, for example, the operation of the gear at the lowermost or first forward speed.

If toothings $c$ and $r$ had equal pitch circles and if a ratio from 4 to 1 were to be obtained for this speed, the diameter of R would be necessarily four times greater than the diameter of the central wheel M.

On the contrary, when two toothings are provided—one of which, r, has a diameter smaller than the other one c—it is clear that the planet-wheel itself will introduce an additional demultiplying, so that annulus R can be given a reduced diameter, other things being equal.

For back drive, claws g are clutched with claws $g_2$ rotatively fast with C and the planet-carrier A is stopped so that the same advantage will subsist.

Otherwise, the operation of the gear is exactly the same as described in the above mentioned patent.

As an illustration, if the various wheels are given the following numbers of teeth:

M=27  c=28
m=21  r=14
B=69  R=57
C=15 the following ratios are obtained:

Forward speeds: 0.238—0.453—0.73—1
Back drive: (—0.132)

The ratio of the number of teeth and, thence, of the diameter of annulus R, to that of the central wheel M which would have been equal to 4.2 with an ordinary spur planet-wheel is reduced by using a step planet-wheel, for the same first-speed ratio, to 2.1.

As it is generally more interesting to reduce the diametral size on the side opposite to the engine, this reduction by one-half of the annulus R is extremely worth-while for the construction of the gear-box.

Figure 2:
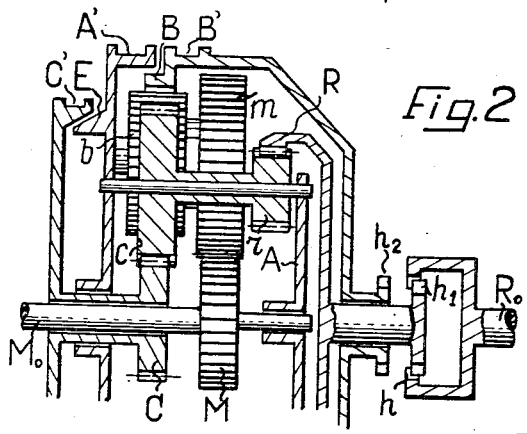
Fig. 2 shows another embodiment in which both planet-wheels are stepped and in which the back drive is obtained by changing the driven member.

The embodiment shown in Fig. 2 differs from that of Fig. 1 by the two following features.

The back drive is obtained by changing the driven member which then becomes annulus B, the forward function of which has been defined hereabove (the second-speed is obtained by stopping said annulus B), and both planet-wheels are provided with two different toothings, the toothings of the planet-wheel which interconnects M and B being referred to by m and b, while the toothings of the other planet-wheel which is similar to that shown in Fig. 1 and which interconnects C and R are referred to by c and r.

At all forward speeds, the ultimate driven shaft $R_0$ on which claws h are keyed is made rotatively fast with annulus R by clutching said claws h with claws $h_1$ keyed on R.

The demultiplied speeds are obtained as described above by selectively stopping A, B and C, and the direct drive is obtained, as previously, by means of a clutch E which, in the example shown, makes A rotatively fast with C. However, as already explained, the direct drive could be also obtained by making any two coaxial members of the gear, viz. in the example shown, the two central wheels M and C, the two annuli B and R and the planet-carrier A rotatively fast together.

In the example shown in Fig. 2, to shift into back drive, claws h rotatively fast with $R_0$ are brought into clutching with claws $h_2$ rotatively fast with annulus B (which is made possible by the fact that said annulus is, in this example, centered on the driven side), and planet-carrier A is simultaneously held stationary.

With the following numbers of teeth:

M=20  C=16
m=29  c=26
b=23  r=12
B=72  R=54 the following ratios are obtained:

Forward speeds: 0.136—0.29—0.567—1
Back drive: (—0.22)

It is obvious that the use of one single step planet-wheel may be combined with the back drive device shown in Fig. 2 and that the use of two step planet-wheels may be also combined with the back drive device shown in Fig. 1.

Figure 3:
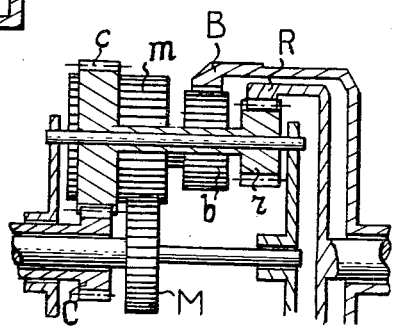
Fig. 3 is an alternative embodiment of the device shown in Fig. 2.

Fig. 3 shows an alternative embodiment for mounting the various wheels.

The interconnection between C and R through a step planet-wheel c—r has not been modified, but the toothing of annulus B (and, thence, the toothing b of the corresponding planet-wheel) has been shifted towards the right to bring it nearer the toothing of R, which permits reducing the axial size of the flange connecting annulus B to its hub, when said annulus is centered on the right-hand side, as shown in Fig. 2.

It will be understood that, in the device of Fig. 1, said annulus B could be centered on the right-hand side as well, the direct drive clutching then taking place between, for example, A and C, the means for stopping A being then located nearer to the engine, as shown in Fig. 2.

It is to be pointed out that the right-hand centering of annulus B, as shown in Figs. 2 and 3, offers the advantage of simplifying the construction of the planet-carrier to which it is then no more necessary to add an additional flange to permit access to the stopping means.

It may be also pointed out that when a smaller number of different speed ratios is required, it will be possible to omit, in the device of Fig. 1, annulus B and, thence, the second speed. Such a reduced embodiment has not been shown in the drawings since it reads on Fig. 1 as well.

Figure 5:
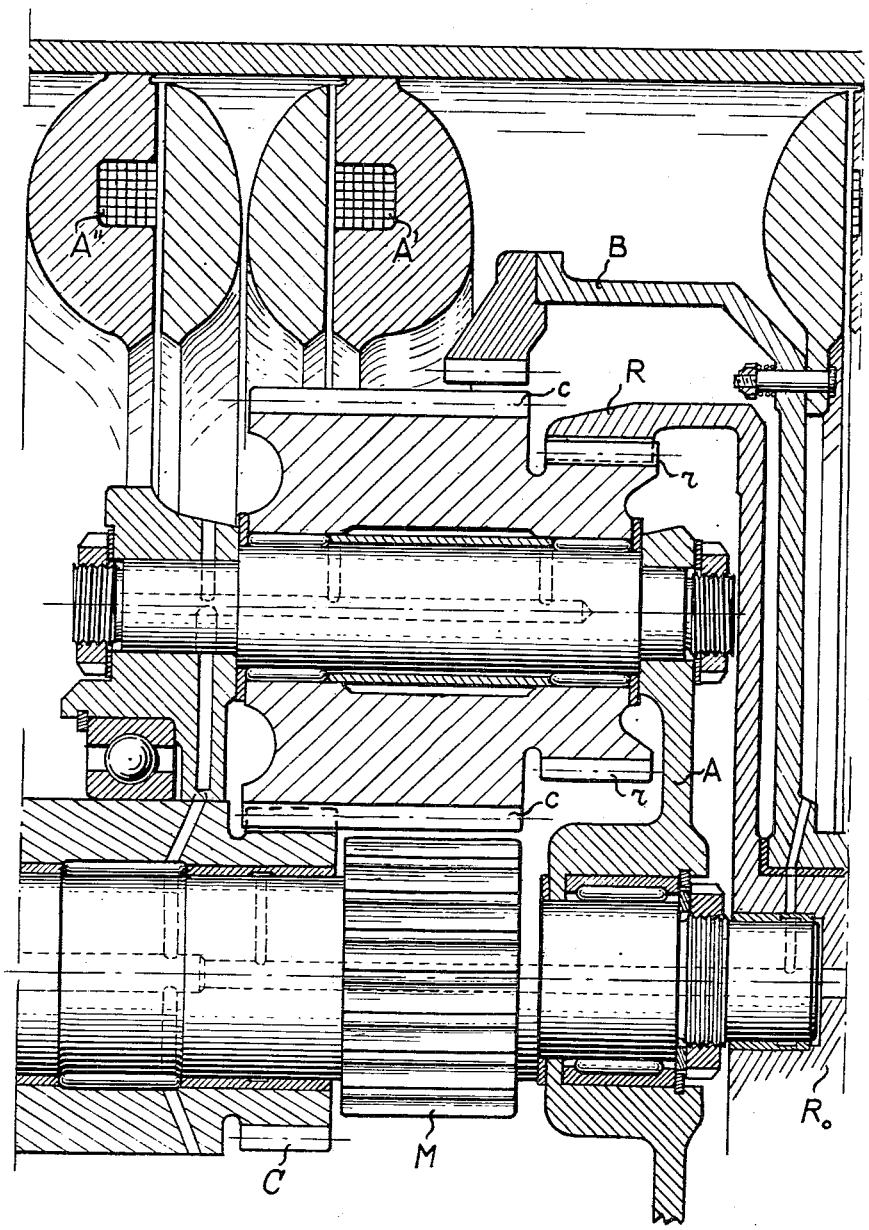

In Figs. 4, 4a and 5, there is shown at M the downstream central wheel, at C the upstream central wheel and at A the planet-carrier. The diametral flanges of the two internal tooth annuli R and B are disposed in this order downstream the whole epicyclic gear.

Since the diameter of the central wheel M determines that of all other wheels of the epicyclic gear, said central wheel has been given, in this constructive embodiment, the smallest diameter consistent with the diameter of the shaft carrying said central wheel.

The use of a step planet-pinion c—r between the central wheel C and the internal tooth annulus R permits increasing sufficiently the diameter of the central wheel C to accommodate the toothing c of said step planet-pinion out of contact with the toothing of the central wheel M without providing an additional meshing area between m and c for accommodating the toothing of M, which would increase the axial size of the gear-box.

With an ordinary planet-pinion having one single spur toothing, the ratio to be adopted between the diameter of the central-wheel C and that of the internal tooth annulus R would be equal to the ratio between their numbers of teeth, which would lead, for the same diameter of R, to adopt for C a diameter which would be too small and smaller than the diameter of the central-wheel M.

On the contrary, in the device of Figs. 4, 4a and 5, the central-wheel C, which has a larger diameter, acts in the same manner as if its diameter were reduced in the ratio of the diameter of r to that of c.

The use of a small central wheel M obviously permits reducing the diameter of the internal tooth annulus B corresponding to the ratio required for the second forward speed. In these conditions, the diameters of all toothings may be so computed that the internal toothing of annulus B is out of contact with the toothing c of the step planetary pinion, without using a step pinion as the other planetary-wheel m, which contributes to reduce the general axial size for the same reason as exposed above with reference to the diameter difference between C and M.

In Fig. 4a, in order to show clearly both planet-wheels which actually mesh with one another, as shown in Fig. 4, the half-sectional view through the axis of planet-wheel m has been rotated to be brought into the plane of the drawing.

On the other hand, in the constructive embodiment shown in Figs. 4, 4a, and 5, the planet-carrier A is centered on the shaft of the central wheel M through a bearing having a considerable axial size and it may be easily seen, on the drawing, that said bearing is accommodated on the shaft under the smaller toothing $r$ of the step planet-wheel.

In this constructive embodiment, the central wheels M and C are made rotatively fast with the prime driving shaft $M_0$ selectively or simultaneously through two friction clutches, which permits suppressing one rotary connection with respect to the embodiment shown in Fig. 1.

As previously, the annulus R is fixedly fast in rotation with the ultimate driven shaft $R_0$ and the central wheel C, planet-carrier A and annulus B are provided with means to hold them stationary or brakes.

In the example shown, the three brakes and the two clutches are constituted by five electro-magnets ensuring a smoothness and progressivity of the braking and clutching actions, so that the change speed device according to the invention is an extremely supple device operating in particularly good conditions.

The planet-carrier is adapted to be held stationary by being provided with two electro-magnets instead of a single one, to take into account the fact that said planet-carrier must be held stationary for the lowermost forward speed and, thence, for the highest reaction torque. The two above mentioned electro-magnets, referred to by A' and A", respectively, act on either side of the upstream flange of the planet-carrier. The two other braking electro-magnets are shown at B' and C', respectively, while the clutching electro-magnets are shown at E' and M'. With this arrangement, to obtain the first forward speed, it suffices to energize simultaneously electro-magnets M', A'—A"; the sound speed is obtained by energizing the electro-magnets M' and B'; the third speed by energizing M' and C'; the direct drive by energizing M' and E' and the back drive by energizing E', A'—A".

With the following numbers of teeth:

$M=17$     $C=21$
$m=34$     $c=30$
$B=85$     $r=22$
               $R=73$ there is obtained for forward speeds the following ratios: 0.17—0.31—0.55—1; and for back drive: —0.21.

Finally, it may be seen that, thanks to the various arrangement described above, all members of the epicyclic gear are easily contained within an extremely compact casing S.

While the invention has been described with particular reference to preferred embodiments, it is not intended to limit the scope of the invention to the embodiments illustrated, nor otherwise than by the terms of the subjoined claims.

What is claimed is:

1. An epicyclic change-speed gear comprising a driving shaft and a driven shaft having a common axis, a planet carrier loosely mounted on its axle and four members coaxial therewith, that is a first central wheel adjacent to a second central wheel, and two innerly toothed crown-wheels adjacent to each other constituted by bell shaped members one mounted within the other, said planet carrier carrying at least two intermeshing planetary pinions one of which also meshes with said first central wheel as well as with the outer crown-wheel while the other pinion also meshes with said second central wheel as well as with the inner crown-wheel, at least one of said pinions being provided with two toothings of different pitch diameter, means to prevent selectively said second central wheel, said planet carrier and said outer crown-wheel from rotating, one of said shafts being locked in rotation with one of said coaxial members, and means for selectively connecting in rotation the other of said shafts with one or the other of the two adjacent coaxial members not including the coaxial member to which said one shaft is locked in rotation.

2. An epicyclic change-speed gear according to claim 1, in which said driven shaft is locked in rotation with said inner crown-wheel, means being provided to selectively make said first central wheel and said second central wheel rotatively fast with said driving shaft.

3. An epicyclic change-speed gear according to claim 1, in which the planetary pinion provided with two toothings of different pitch diameter has its larger toothing meshing with the other planetary pinion and also with said second central wheel while its smaller toothing meshes with said inner crown-wheel.

4. An epicyclic change-speed gear according to claim 1, in which said driving shaft is locked in rotation with said first central wheel, means being provided to selectively make said inner crown-wheel and said outer crown-wheel rotatively fast with said driven shaft.

5. An epicyclic change-speed gear according to claim 1, in which each one of said two intermeshing planetary pinions is provided with two toothings of different pitch diameter, the larger toothing of each pinion meshing with the larger toothing of the other pinion and also with one of said central wheels while the smaller toothing of each pinion meshes with one of said crown-wheels.

References Cited in the file of this patent

UNITED STATES PATENTS

| | | |
|---|---|---|
| 798,746 | De Normanville | Sept. 5, 1905 |
| 1,316,740 | Reeve | Sept. 23, 1919 |
| 1,383,988 | De Normanville | July 5, 1921 |
| 2,220,174 | Ravigneaux | Nov. 5, 1940 |
| 2,631,476 | Ravigneaux | Mar. 17, 1953 |

FOREIGN PATENTS

| | | |
|---|---|---|
| 630,508 | Great Britain | Oct. 14, 1949 |